United States Patent [19]

Srinivasan

[11] Patent Number: 5,361,187
[45] Date of Patent: Nov. 1, 1994

[54] CERAMIC DIELECTRIC COMPOSITIONS AND CAPACITORS PRODUCED THEREFROM

[75] Inventor: Thallam T. Srinivasan, Victor, N.Y.

[73] Assignee: Ferro Corporation, Cleveland, Ohio

[21] Appl. No.: 29,559

[22] Filed: Mar. 11, 1993

[51] Int. Cl.$^5$ .......................... H01G 4/10; H01G 4/12
[52] U.S. Cl. .................................... 361/321.1; 501/139
[58] Field of Search ............... 361/321.1, 321.2, 321.4, 361/321.5; 501/134–139

[56] References Cited

U.S. PATENT DOCUMENTS

| | | | |
|---|---|---|---|
| 3,569,802 | 3/1971 | Brauer | 257/43 |
| 4,148,853 | 4/1979 | Schuber | 264/37 |
| 4,477,581 | 10/1984 | Nishioka et al. | 501/137 |
| 4,829,033 | 5/1989 | Menashi et al. | 501/139 |
| 4,863,883 | 9/1989 | Menashi et al. | 501/138 |

FOREIGN PATENT DOCUMENTS 0795451  5/1958  United Kingdom ................ 501/139

Primary Examiner—Geoffrey S. Evans
Assistant Examiner—Michael D. Switzer
Attorney, Agent, or Firm—Shlesinger, Fitzsimmons & Shlesinger

[57] ABSTRACT

Ceramic dielectric compositions for manufacturing multilayer ceramic capacitors (MLCC's) having very high dielectric constants between about 8,000–19,000 and meeting the Z5U and Y5V EIA (Electronic Industries Association) specifications for temperature coefficient of capacitance, are prepared from barium titanate host materials based upon the formulation $(Ba_{1-x}Ca_x)(Ti_{1-y-z}Sn_yZr_z)O_3$, and doped with small amounts of niobium, manganese, lanthanum, zirconium and yttrium oxides to alter the dielectric spectrum so as to meet desired EIA specifications.

12 Claims, 4 Drawing Sheets

CERAMIC DIELECTRIC COMPOSITIONS AND CAPACITORS PRODUCED THEREFROM

BACKGROUND OF THE INVENTION

This particular invention relates to dielectric compositions having very high dielectric constants (k), ranging between 8,000 and 19,000, and low dissipation factors (D.F.), e.g. below about 2.5%. Even more particularly this invention relates to multilayer ceramic capacitors (MLCC's) having high insulation resistance capacitance (RC), e.g., above about 10,000 ohm-farads at 25° C. and above about 1,000 at 85° C., and meeting Z5U-/Y5V type temperature coefficient of capacitance (TCC) characteristics (Z5U = +22 to −56% over temperature range of +10° to +85° C., and Y5V = +22 to −82% over temperature range of −30° to 85° C.).

The novel dielectric formulations developed herein do not contain either Pb, Bi, Cd or Si (low melting point elements) and hence the MLCC's produced therefrom may be fired at high temperatures, e.g. 1360°–1400° C.

Because of their high volumetric efficiency and their small size, multilayer ceramic capacitors of the type described are the most widely used form of ceramic capacitors. Usually they are made by casting thin dielectric tapes, screen printing thereon the metal electrodes, and stacking the printed tapes to form the multilayer ceramic capacitors. There are other means of preparing MLCC's which are described in U.S. Pat. Nos. 3,697,950; 3,717,487, and 3,899,645.

Barium titanate powder is one of the major components most frequently used in the formation of dielectric insulating layers because of its very high dielectric constant (1,000). By selectively substituting the Ba and Ti sites with Ca, Sn, and Zr, one can shift the curie temperature pear to near room temperature, and hence powders having very high dielectric constants, greater than 7,000, may be obtained and also may meet Z5U/Y5V type temperature coefficient of capacitance. Higher dielectric constant, however, also leads to larger fired grain size; and larger grain size should be avoided when the dielectric powders are to be used in thin multilayer capacitor applications.

At present there are no satisfactory high fire (about 1400° C.) Z5U type barium titanate based materials having a fine grain size as small as 2 um. Because the firing temperatures of typical low fire Z5U/Y5V MLCC's are in the range of 1080°–1120° C., several attempts have been made to reduce the sintering temperature of the MLCC's so that Pd/Ag alloys and/or mixtures thereof could be used as internal electrodes, and to enable the fired grain size to be controlled. (See for example U.S. Pat. Nos. 2,908,579, 2,626,220, 3,619,220, 3,638,084, 3,682,766, 3,811,937, and 4,640,905.) However, it is believed that high fire formulations have higher reliability over low fire formulations, possibly because high fire formulations do not have any low melting glass and network formers.

It is an object of this invention, therefore, to make high fire, barium titanate based Z5U/Y5V type dielectrics with uniform fired grain size in the range of 1–9 um, (uniform) [approximately 2 um for Z5U type dielectric and between 4 and 9 um for Y5V type dielectric formulations] while maintaining the dielectric constant as high as 8,000–19,000 and the dissipation factor as low as possible (less than 2.5%).

Another object of this invention is to produce a dielectric formulation containing no glass network formers such as Si, Na and K, and no low melting point elements such as Pb, Cd, and Bi.

A further object of this invention is to provide a dielectric material which may be used in thin dielectric layer MLCC aplications because of its fired grain size (2–5 um).

Yet another object of this invention is to produce a dielectric formulation with a very high dielectric constant, approximately 19,000, which can be used in normal dielectric layer thickness application meeting Y5V type dielectric spectrum, with fired grain size of approximately 9 um.

As noted hereinafter, the above stated objects are achieved by producing a product which may comprise a host material $(Ba_{1-x}Ca_x)(Ti_{1-y-z}Sn_yZr_z)O_3$ as a major component, and several (one or more) minor components (dopants) of oxides of lanthanum, yttrium, zirconium, niobium and manganese, the total amount of dopants, not exceeding 2–3 wt. % and where the value of x is 0.10 to 0.14, y is 0.03 to 0.12, and z is 0.04 to 0.10.

BRIEF SUMMARY OF THE INVENTION

The present dielectric formulation comprises of a two step process. Initially, the host material is made and then is selectively doped in such a way as to alter the curie peak, dielectric constant and dielectric loss, so that the product meets certain EIA specification of temperature coefficient of capacitance. To produce the host material, correct proportions of barium carbonate, calcium carbonate, titanium dioxide, tin oxide and zirconium oxide (all greater than 99% pure) are wet mixed for severl hours (4–16 hours), and dried and calcined at 1050°–1200° C. for 2–4 hours. They are then pulverized and selectively doped with oxides of Y and/or La, and/or Zr and/or Nb and manganese in the ball mill for 2–6 hours. The milled powders are then dried and size reduced using standard industrial milling techniques. These powders are then used to make multilayer ceramic capacitors using the standard process.

The final compositions have very high dielectric constants (k = 8,000–19,000), low dissipation factors (D.F.), e.g. below about 2.5%, and high insulation resistance capacitance (RC), above about 10,000 ohm-fared at 25° C. and above about 1000 at 85° C. They meet temperature coefficient of capacitance EIA specification for either Z5U or Y5V type capacitors. The final fired grain size is about 1.5–2 um for Z5U and near Z5U type dielectric formulations, about 4–5 um for Y5V type dielectric formulations, and about 9 um for Y5V (k 19,000) type dielectric formulations.

Lanthanum is added to shift the curie peak, increase the dielectric constant and to reduce the grain size. Yttrium is added to suppress the curie peak, and hence it broadens the dielectric spectrum and reduces the grain size and makes it uniform. However Yttrium oxide is refractory in nature and hence the final firing temperature of the dielectric composition increases with the addition of yttrium oxide. Small amounts of niobium oxide when added to the host supresses the curie peak, and reduces the final firing temperature and the fired grain size. Zirconium oxide may be added to the host material to increase the slope of the right hand side of the dielectric spectrum so that it meets Z5U, near Z5U or Y5V type EIA specifications. Manganese carbonate or nitrate or oxide may be added to improve the sintering characteristics as well as to improve the insulation resistance, possibly by stabilizing the local charge fluctuation. The total dopant addition preferably is about 2 weight percent to the host material. More than this quantity may reduce the room temperature dielectric constant and/or its peak, and because of the peak shift the material may not meet Z5U type EIA specification. Moreover, it may also change the insulation resistance value; and the excess yttrium oxide may increase the final sintering temperatures.

DETAILED DESCRIPTION OF THE PREFERRED EMBODIMENT

Figure 1:
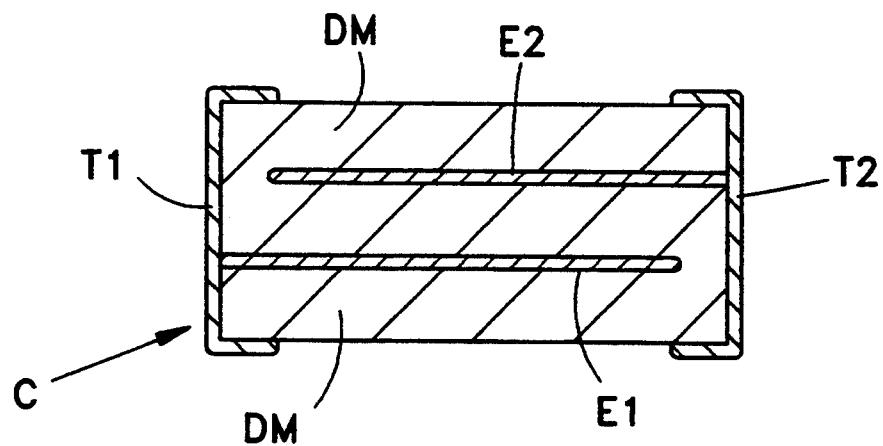
FIG. 1 is a cross sectional view of a monolithic multi-layered ceramic capacitor made according to one embodiment of this invention.

The first step in this invention is to produce a barium titanate host material comprising a mixture of barium carbonate, calcium carbonate, titanium dioxide, tin oxide and zirconium oxide, and based on the formulation $(Ba_{1-x}Ca_x)(Ti_{1-y-z}Sn_yZr_z)O_3$, where x is 0.10–0.14, y is 0.03–0.12, and z is 0.04 to 0.10. These components, in correct proportions, and all being greater than 99% pure, are wet mixed for from 4–16 hours, and are dried and calcined at 1050°–1200° C. for 2–4 hours. The resultant host material is then pulverized and selectively doped with oxides of Y and/or La, and/or Zr and/or Nb and manganese by ball milling the host and dopant for 2–6 hours. The milled dielectric powders are then dried and are further reduced to a desired particle size by using standard industrial milling techniques. As noted hereinafter, these doped barium titante based dielectric materials were used to produce multilayer ceramic capacitors of the type denoted generally at C in FIG. 1, where E1 and E2 denote the spaced electrodes that are embedded in the dielectric material DM and connected in conventional manner to the end terminations T1 and T2, respectively.

Figure 2:
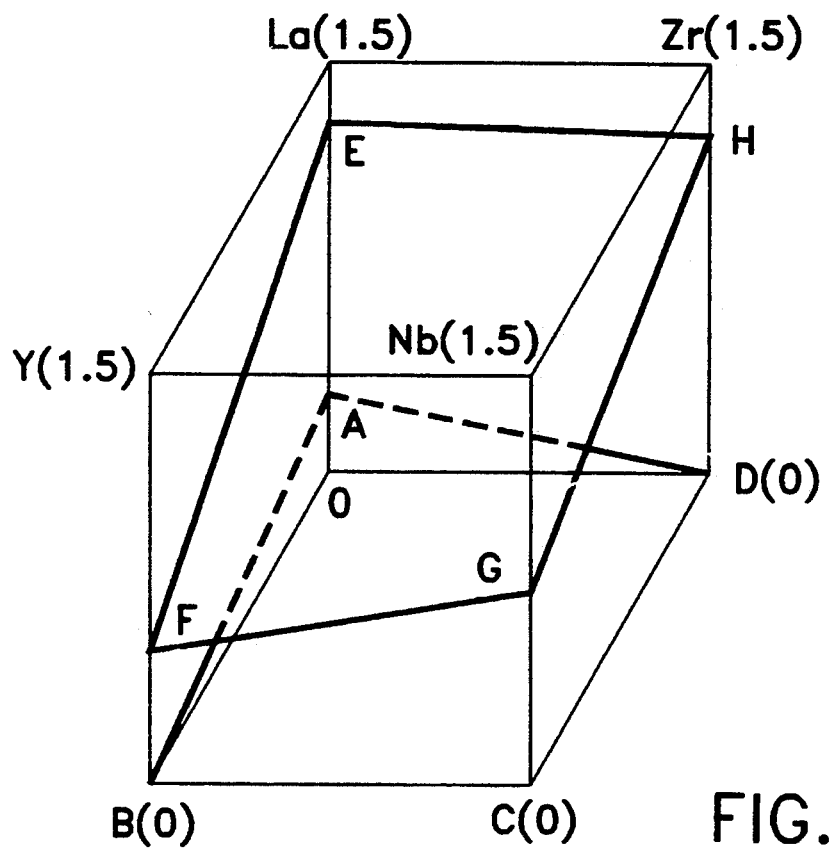
FIG. 2 is a quarternary diagram depicting the relative proportions of the additives to the ceramic compositions made in accordance with this invention.

For test purposes, forty-four different sample test capacitors were fabricated having thin dielectric layers formulated in accordance with the ceramic compositions of the present invention. Forty of these samples, identified as S. No. 1 through 40 on the following Tables I, II and III, were made with the same host material (hereinafter Host #1), but the dopants and their levels (in percent weight of the host material) are different, as explained hereinafter with respect to FIG. 2, and as noted hereinafter in Tables I to III. For example, to prepare sample No. 1, 100 g of the calcined host composition $(Ba_{0.88}, Ca_{0.12})(Ti_{0.88}, Sn_{0.03}, Zr_{0.09})O_3$, lanthanum oxide (0.8%), yttrium oxide (0.5%), zirconium oxide (0.4%), and manganese oxide (0.2%) were wet balled milled in the polypropylene container for 6 to 16 hr., using zirconia balls as media and water as wetting agent. Darvan C, which is an alkali free aqueous dispersing agent comprising a mixture of polyelectrolytes of ammonia and sulphur available from W. P. Vanderbilt Co, Conn., in an amount of 1% was added as a dispersing agent to the above mix. This was then dried, and the ceramic slip was made using B7 MEK based binder, keeping a ceramic to binder ratio of 50C:50B by weight percent. Other compatible slurry may be used to make ceramic tapes. This slurry was mixed for 16 hours, discharged, de-aired and then cast in accordance with standard techniques, into a tape with green thickness approximately 1 mil. The tape was then blanked using a standard blanking tool, screen printed with the palladium electrode (from Ferro Corporation #DP 38-008 PD) and made into MLCC's. They were then fired at 1380°±20° C. with 2 hours soaking time, The sintered capacitors had four effective dielectric layers with dielectric thickness about 0.8 to 1.2 mil. Dupont's silver paste #6337 was used as termination paste which is a mixture of silver and glass frit in a binder, applied at opposite ends of the multilayer capacitors to connect alternate electrodes, and these capacitors were again fired at 750° C. for 15 minutes to sinter the termination on to the multilayer capacitors. The capacitance (C), the dissipation factor (D.F.) and the capacitance change with temperature versus capacitance at 25° C. (TCC) were then measured using the capacitance bridge, Hewlett Packard model #4278A at 1 KHz measurement frequency with 0.5V applied voltage from −55° C. to +125° C. at about 20° C. intervals.

By knowing the electroded area and the dielectric thickness, the value of k is computed using the standard formula $C=KA\epsilon_0 n/t$, where c is capacitance in farads, 't' is the thickness in meters, 'A' is the area in square meters '$\epsilon_0$' is the permittivity of the free space in farads/meter, n is the number of effective dielectric layers and K is the dielectric constant of the material being used in the MLCC.

As noted in Tables I to III, samples 1–12 meet the Y5V type EIA specifications, with the TCC not exceeding +22 and −82% between −30° C. and +85° C., while for samples 13–25 the TCC fits near Z5U type specification (i.e.) at 85° C., the TCC is −60% instead of −56%. Moreover, samples 26–38 meet the Z5U type EIA specification. All the above samples 1–38 were done on a small scale. In the case of sample No. 39, 100–500 lbs. of the calcined host material were doped with 0.95% of lanthanum oxide, 0.5% of yttrium oxide, 0.25% zirconium oxide and 0.2% manganese oxide in the ball mill and they were milled for 2–6 hours. Zirconia balls and water were used as media and wetting agent respectively. Darvan C (1%) was used as a dispersing agent. This was then dried, pulvarized and MLCC's were made as given in the above sample No. 1. As in the case of sample No. 39, for sample No. 40 100–500 lbs. of calcined host material was doped in the ball mill. The dopants were 1.1% lanthanum oxide, 1.25% zirconium oxide and 0.25% manganize oxide. They were milled for 2–6 hrs., dried, and pulvarized. Multilayer capacitors were made using the standard processing tehniques as given in the sample No. 1.

Figure 3:
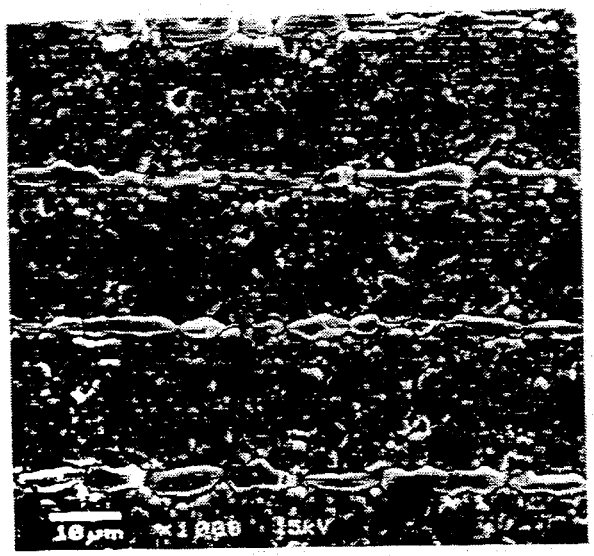
FIG. 3 is a typical scanning electron microscope photo-micrograph showing enlarged by 1000× a thermally etched Z5U type of capacitor made according to this invention.
Figure 4:
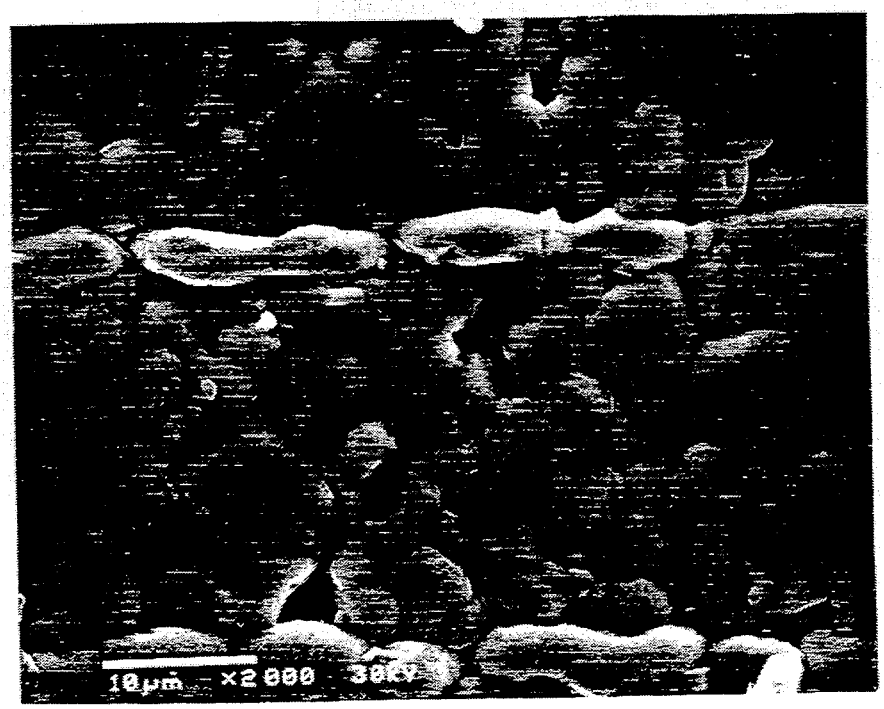
FIG. 4 is a typical scanning electron microscope photo-micrograph showing enlarged by 2000× a thermally etched Y5V type of capacitor made according to this invention.

The dielectric properties of all the samples 1–40 are summarized in Tables I to III, and demonstrate that multilayer ceramic capacitors manufactured from the ceramic composition of the invention have very high dielectric constants, k=8,000–19,000, low dissipation factor at room temperature ≦2.5% with TCC meeting Z5U or Y5V type specifications and high insulation resistance greater than 10,000 ohm-farad at 25° C. The dissipation factor for Z5U/Y5V type dielectric is <5% (at 0.5V, 1 KHz, 25° C.) according to EIA (Electronic Industries Association) specifications. Photomicrographs of Z5U and Y5V capacitors made according to this invention are shown in FIGS. 3 and 4, respectively. Table IV refers to test samples 41–48, four of which (S. No. 44, 45, 46 and 48) are the remaining capacitor (MLC) samples, and the others of which (S. No. 41–43) are disc-shaped samples of the type noted hereinafter. No dopants have been added to the samples 41–48 reported in Table IV, and as distinguished from samples No. 1 to No. 40, the host material has been changed per the formulation $(Ba_{1-x+w}Ca_x)(Ti_{1-y-z}Sn_yZr_z)O_3$, where X=0.10, Y=0.12–0.14, Z=0–0.04 and W=0–0.01. Excess barium has thus been added to the base composition of some of samples 41–48, and in such a way that the curie temperature has been shifted to well below the normal temperature, maintaining high dielectric constant at room temperature. To prepare the samples, the proportionate amounts of barium and calcium carbonate, titanium, tin and zirconium oxides were wet ball milled (using conventional techniques) for 4–16 hours. They were then dried, calcined at 1050°–1200° C. for several hours (2–4). These powders were then pulverized and size reduced using standard industrial milling techniques. Some of the powders were used to make discs, (dia. 0.5", thickness 0.04", standard industrial techniques were used) and other powders were used to make multilayer ceramic capacitors (Casting of the tapes and making MLCC's were similar to the techniques given in the above sample 1.) They were then sintered between 1350°–1400° C. for a few hours (2–5) and tested for their electrical performance, the results of which are given in the Table IV.

Figure 5:
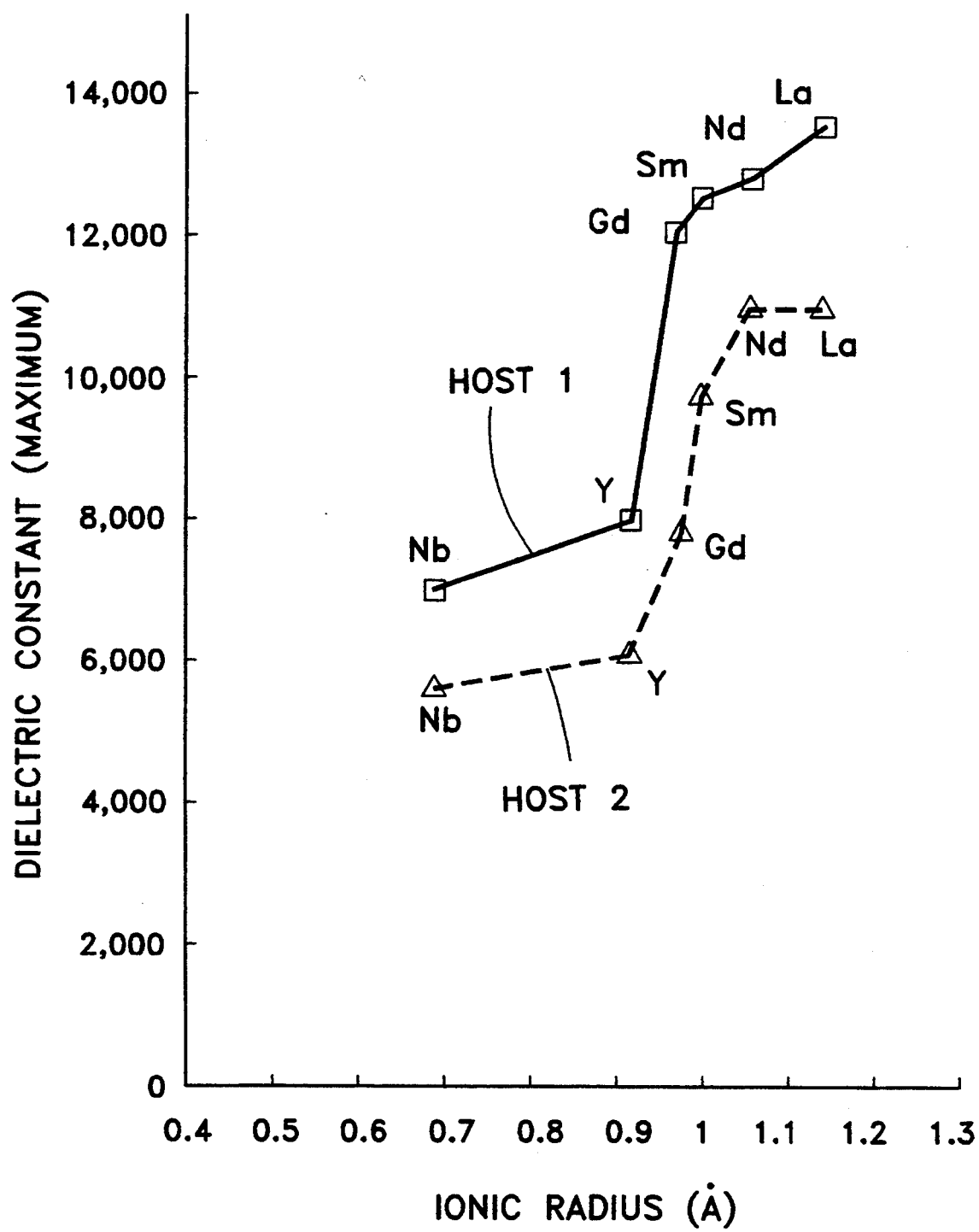
FIG. 5 is a graph illustrating the effect of the ionic size of a dopant on the peak dielectric constant of a capacitor made according to this invention.
Figure 6:
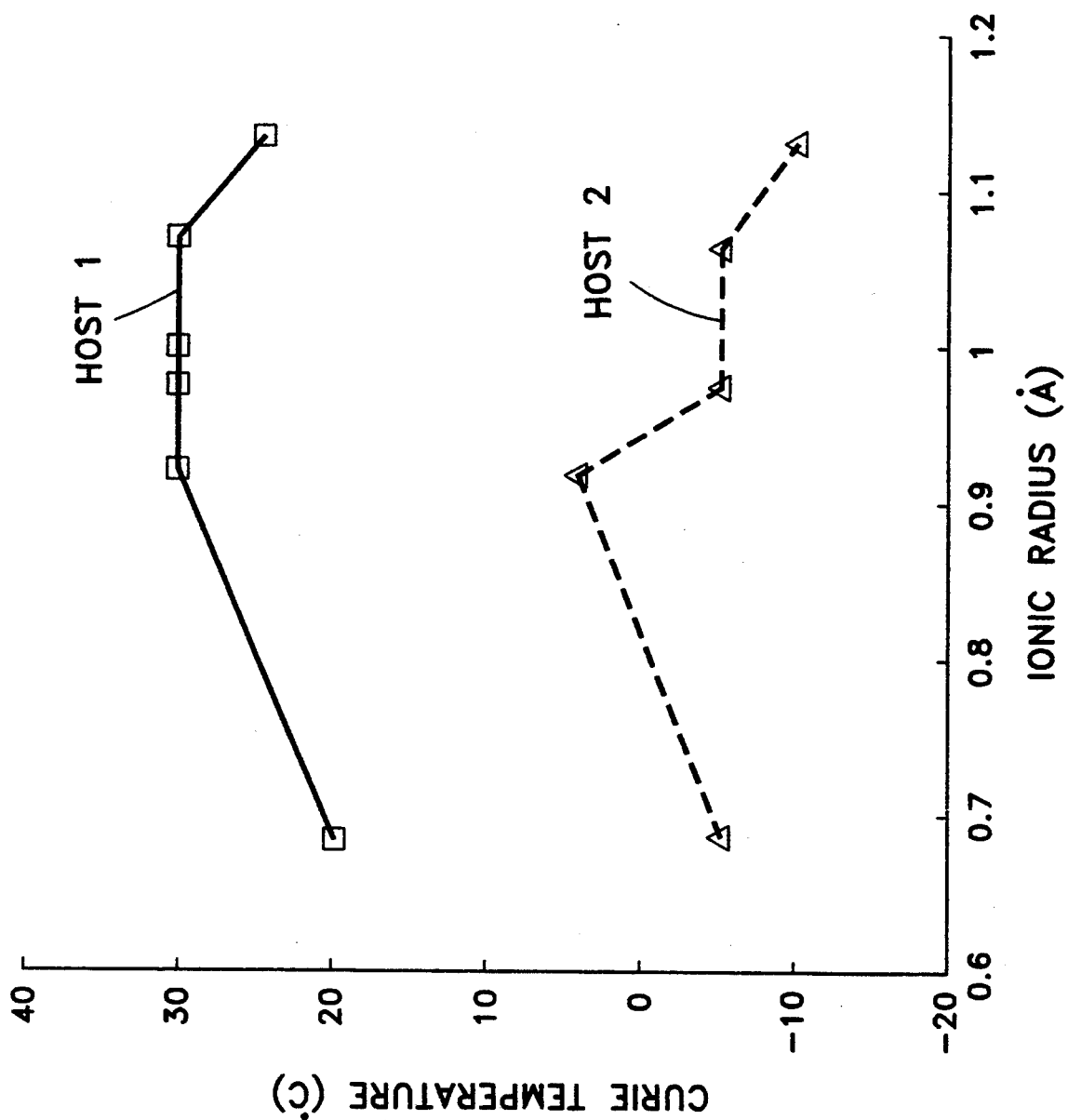
FIG. 6 is a graph illustrating the effect of the ionic size of a dopant on the curie temperature of such a capacitor.

Other disc-shaped samples of a dielectric material made according to this invention were also prepared and tested to determine the dielectric properties of the samples vs. the ionic size of the dopants added to the host material. For example, two different host materials (Host #1 and Host #2) having two different dopant levels, 0.7% for Host #1 and 1% for Host #2, were selected and doped using the two host systems $(Ba_{1-x}Ca_x)(Ti_{1-y-z}Sn_yZr_z)O_3 +0.15\%\ MnCo_3$ where x=0.12 and 0.14, Y=0.03 and 0.04, and z=0.09 and 0.10. The dopants were oxides of Nb, Y, Gd, Sm, Nd and La with the atomic radius varying between 0.69 Å and 1.14 Å. Plots (FIGS. 5 and 6) were made between dielectric maxima and curie temperatures vs. ionic size of the dopants. The electrical testing was performed on disc specimens fired between 1325° and 1350° C. All the discs were made using standard industrial practice. The dielectric maxima seems to increase with the increase in ionic size of the dopants, as shown by the 'S' shaped curves of FIG. 5. The nature of these curves does not change for the two different host materials. But the value of k maximum and curie peaks were different for the two hosts with the corresponding dopant additions. When dopant level was 0.7%, the dopants stay in grain boundaries and when the level is increased, a small quantity goes in the structure, hence, supresses the peak dielectric constant as well as shifts the curie peak to the lower temperature. All the fired discs were polished and thermally etched at 1225°–1250° C. for 1 hr. in a standard box type kiln. Photomicrographs were taken using a scanning electron microscope, and grain sizes were determined using linear intercept method. The results are given in Table V along with the electrical test results.

The dielectric constants vs. ionic sizes plot (FIG. 5) was made using peak dielectric constant value rather than room temperature values, because the addition of dopants may shift the curie peak differently and hence true comparison may not be possible between the ionic size and the dielectric constant. Also, the firing temperature has been optimised for each composition to get optimum performance of the materials. From the Table V it is clear that the dielectric constant increases with the increase in ionic size of the dopants, but the value of grain size also increases. For example, niobium oxide addition (0.7% in Host #1) supresses the grain size as well as supresses the curie peak. But the addition of oxides of lanthanum, neodymium, samarium or gadolinium (0.7% in Host #1) do not supress the curie peak, but the grain size is large (8 to 11 m). When the dopant level was increased to 1% (in Host #2), niobium oxide addition supresses further the dielectric constant as well as the grain size (1.5 um). But the dopants (1% in Host #2) lanthanum, neodymium, samarium and gadolinium oxides do not affect the grain sizes very much, but the curie peaks have been supressed. The addition of yttrium oxide (0.7% and 1.0%) do not affect the dielectric peak value very much, but the grain size has been reduced to some extent. (6.8 um for 0.7% in Host #1 vs. 4.9 um for 1% in Host #2). So, the excess amount of rare earth oxides (lanthanum, neodymium, samarium and gadolinium), when it is doped in the host material reduce the dielectric constant value, but the values of grain size do not reduce much. So, it is apparent from the above examples small quantities of dopants (the above rare earth oxides) present in the system increase the dielectric constant value. Moreover, by doping the system (barium titanate based host) with combinations of the above oxides it has been found possible to achieve better dielectric constant (high) value as well as small uniform grain size.

From the foregoing it will be apparent that selected EIA specifications may be met by adding various combinations of y, La, Zr, Nb and Mn oxides as dopants to the host material $(Ba_{0.88}Ca_{0.12})(Ti_{0.88}Sn_{.03}Zr_{0.09})O_3$ (i.e. Host #1). The oxides may comprise minor components of one or more of lanthanum oxide (0.03 to 1.3%), zirconium oxide (0 to 1.25%), yttrium oxide (0.2 to 0.5%), niobium oxide (0 to 0.7%), the wt. % ranges of which are delineated in FIG. 2 by points A through H. The manganese oxide may be added in the form of carbonates or nitrates, and in an amount of about 0.15 to 0.25%. Zirconium oxide was added to modify the slope of the dielectric spectrum so that it meets the EIA standards of Z5U and Y5V, and manganese oxide was added to improve the dielectric loss and insulation resistance. Lanthanum oxide may be selected over to the other rare earth oxides (see Table V) because the dielectric constant value is higher for the lanthanum doped material. Yttrium oxide was added, because the dielectric maxima was not suppressed very much for the two different dopant levels (0.7% in Host #1 and 1% in Host #2), but the grain size reduces for the higher level of doping (1%).

It is very apparent from the above tests that it is possible to get very high value of dielectric constant (8000), while still maintaining grain size less than 2 um. (See samples 13 through 25 for near Z5U, and 32 through 39 for Z5U in Tables I to III.) When Yttrium oxide is not added to the host formulation, it is possible to get higher dielectric constant (15000), meeting EIA standards of Y5V, but the grain size is also larger (5 um). (See sample 40 in Tables I to III.) Also, by modifying the Ca, Sn and Zr content in the host material and the dopant levels, it is possible to get good Z5U and Y5V formulations. From the FIG. 5 curves it is apparent also that addition of Nd or La increases the dielectric constant. Moreover, the dopants and their levels may be adjusted to get either Z5U or Y5V type dielecctric materials with K approximately 8,000–19,000. In the case of Y5V (k about 19,000) formulations, the host material was modified, but no dopants were added to the host to produce the Y5V formulation. This formulation does not need any dopants, but the host may contain excess barium ions. The values of K reported herein may differ by about 2% depending on the particle size of the final formulated powder and the processing involved in making the thin insulating dielectric layer. Because of the final particle size, the final firing temperature may also vary between 1360° and 1400° C.

While this invention has been illustrated and described in detail in connection with only certain embodiments thereof, it will be apparent that it is capable of still further modification, and that this application is intended to cover any such further modifications as may fall within the scope of one skilled in the art or the appended claims.

The above-noted Tables I through IV are as follows:

TABLE I

| S. No. | La$_2$O$_3$ | Y$_2$O$_3$ | Nb$_2$O$_5$ | ZrO$_2$ | MnO$_2$ |
|---|---|---|---|---|---|
| 1. | 0.8 | 0.5 | 0 | 0.4 | 0.2 |
| 2. | 0.8 | 0.4 | 0 | 0.4 | 0.2 |
| 3. | 0.9 | 0.3 | 0 | 0.6 | 0.2 |
| 4. | 0.5 | 0.5 | 0.2 | 0.4 | 0.2 |
| 5. | 0.5 | 0.3 | 0.3 | 0.4 | 0.2 |
| 6. | 0.5 | 0.3 | 0.4 | 0.4 | 0.2 |
| 7. | 1.1 | 0 | 0 | 1.25 | 0.25 |
| 8. | 0.9 | 0.5 | 0 | 0.6 | 0.2 |
| 9. | 1 | 0.3 | 0 | 0.6 | 0.2 |
| 10. | 0.5 | 0.5 | 0.2 | 0.4 | 0.2 |
| 11. | 1 | 0.5 | 0 | 0.4 | 0.2 |
| 12. | 0.9 | 0.5 | 0 | 1.0 | 0.2 |
| 13. | 1 | 0.5 | 0 | 0.4 | 0.2 |
| 14. | 1 | 0.5 | 0 | 0.4 | 0.2 |
| 15. | 1 | 0.3 | 0 | 0.4 | 0.2 |
| 16. | 0.9 | 0.5 | 0 | 0.4 | 0.2 |
| 17. | 1.2 | 0.5 | 0.2 | 0.9 | 0.2 |
| 18. | 0.3 | 0.3 | 0.7 | 0.4 | 0.2 |
| 19. | 1 | 0.3 | 0.1 | 0.4 | 0.2 |
| 20. | 1 | 0.3 | 0.2 | 0.4 | 0.2 |
| 21. | 1 | 0.4 | 0 | 0.4 | 0.2 |
| 22. | 1.1 | 0.2 | 0 | 0.8 | 0.2 |
| 23. | 1 | 0.3 | 0 | 0.6 | 0.15 |
| 24. | 1 | 0.3 | 0 | 0.5 | 0.15 |
| 25. | 1 | 0.3 | 0 | 0.8 | 0.15 |
| 26. | 0.5 | 0.3 | 0 | 0.4 | 0.2 |
| 27. | 1 | 0.3 | 0 | 0.4 | 0.15 |
| 28. | 0.8 | 0.4 | 0 | 0.4 | 0.15 |
| 29. | 1.3 | 0.3 | 0 | 0 | 0.2 |
| 30. | 1 | 0.3 | 0 | 0 | 0.2 |
| 31. | 1.15 | 0.3 | 0 | 0 | 0.2 |
| 32. | 1.2 | 0.2 | 0 | 0.9 | 0.2 |
| 33. | 1 | 0.3 | 0 | 0.6 | 0.15 |
| 34. | 1 | 0.5 | 0 | 0.4 | 0.2 |
| 35. | 1 | 0.4 | 0 | 0.4 | 0.15 |
| 36. | 1.1 | 0.2 | 0 | 0.8 | 0.2 |
| 37. | 1 | 0.5 | 0 | 0.25 | 0.2 |
| 38. | 0.9 | 0.5 | 0 | 0.25 | 0.2 |
| 39. | 0.95 | 0.5 | 0 | 0.25 | 0.2 |
| 40. | 1.1 | 0 | 0 | 1.25 | 0.25 |

TABLE II

| S. No. | KRT | KMAX | D.F. at R.T. (%) | DIELECTRIC THICKNESS (mil.) | CURIE TEMP. (°C.) | TCC (%) AT (°C.) −30 | 10 | 85 |
|---|---|---|---|---|---|---|---|---|
| 1. | 12,955 | 13,293 | 1.25 | 1.14 | 20–25 | −72 | −12 | −63 |
| 2. | 14,013 | 14,216 | 1.62 | 1.2 | 25 | −78 | −23 | −64 |
| 3. | 12,889 | 13,224 | 1.32 | 1.23 | 25 | −78 | −16 | −65 |
| 4. | 12,981 | 13,270 | 1.15 | 1.23 | 20–25 | −72 | −7 | −61 |
| 5. | 13,205 | 13,202 | 2.41 | 1.26 | 25 | −78 | −21 | −62 |
| 6. | 11,438 | 11,593 | 2.09 | 1.20 | 20 | −72 | −11 | −61 |
| 7. | 12,341 | 12,665 | 2.2 | 1.1 | 25 | −81 | −22 | −65 |
| 8. | 11,990 | 12,566 | 1.29 | 0.97 | 20 | −69 | −3 | −63 |
| 9. | 12,077 | 11,931 | 2.74 | 0.96 | 25 | −73 | −18 | −62 |
| 10. | 12,780 | 12,800 | 2.04 | 1.03 | 25 | −76 | −18 | −61 |
| 11. | 11,305 | 12,347 | 0.99 | 0.94 | 15–20 | −61 | 0 | −62 |
| 12. | 11,000 | 12,000 | 0.9 | 1.09 | 10–15 | −60 | 0 | −60 |
| 13. | 9,261 | 9,722 | 1.09 | 1.24 | 20 | −58 | −2 | −58 |
| 14. | 9,643 | 10,466 | 0.86 | 1.19 | 15 | −56 | 4 | −60 |
| 15. | 12,261 | 12,482 | 1.69 | 1.16 | 25–30 | −73 | −19 | −59 |
| 16. | 11,252 | 11,844 | 1.06 | 1.15 | 20 | −68 | −6 | −60 |
| 17. | 7,644 | 9,199 | 0.62 | 1.14 | 0 | −20 | 16 | −60 |
| 18. | 9,814 | 10,047 | 1.91 | 1.13 | 20 | −63 | −7 | −60 |
| 19. | 10,810 | 11,200 | 1.25 | 1.18 | 20 | −69 | −8 | −60 |
| 20. | 9,548 | 10,083 | 1.06 | 1.14 | 20 | −60 | −3 | −60 |
| 21. | 10,385 | 10,413 | 2.35 | 0.95 | 25–30 | −67 | −18 | −57 |
| 22. | 10,836 | 10,840 | 2.10 | 1.1 | −20 | −68 | −8 | −59 |
| 23. | 10,886 | 10,942 | 2.32 | 1.01 | 25 | −70 | −18 | −60 |
| 24. | 10,537 | 10,618 | 2.38 | 0.97 | 30 | −70 | −23 | −58 |
| 25. | 10,967 | 11,073 | 2.62 | 0.83 | 25 | −69 | −14 | −59 |
| 26. | 11,975 | 13,786 | 3.13 | 1.22 | 40 | −83 | −39 | −53 |
| 27. | 9,929 | 9,994 | 2.9 | 1.16 | 30 | −67 | −24 | −52 |
| 28. | 11,812 | 11,796 | 2.7 | 1.14 | 30 | −74 | −30 | −56 |
| 29. | 4,849 | 4,967 | 1.27 | 1.25 | 20 | −39 | −2 | −44 |
| 30. | 7,354 | 7,592 | 1.46 | 1.21 | 30 | −58 | −14 | −47 |
| 31. | 6,138 | 6,294 | 1.18 | 1.33 | 25 | −49 | −7 | −44 |
| 32. | 8,498 | 8,892 | 1.28 | 1.19 | 15 | −53 | 2 | −55 |

TABLE II-continued

| S. No. | KRT | KMAX | D.F. at R.T. (%) | DIELECTRIC THICKNESS (mil.) | CURIE TEMP. (°C.) | TCC (%) AT (°C.) −30 | 10 | 85 |
|---|---|---|---|---|---|---|---|---|
| 33. | 10,138 | 10,200 | 3.53 | 0.82 | 30 | −66 | −18 | −53 |
| 34. | 10,004 | 10,128 | 1.99 | 0.94 | 25 | −62 | −10 | −56 |
| 35. | 10,189 | 10,200 | 3.30 | 0.98 | 30−35 | −65 | −22 | −50 |
| 36. | 8,775 | 9,040 | 1.79 | 0.9 | 20 | −64 | −6 | −56 |
| 37. | 8,724 | 8,779 | 2.28 | 0.91 | 25 | −58 | −11 | −53 |
| 38. | 10,122 | 10,211 | 2.07 | 0.89 | 25−30 | −63 | −15 | −54 |
| 39. | 9,790 | 10,133 | 1.66 | 0.94 | 20−25 | −63 | −8 | −54 |
| 40. | 14,898 | 16,332 | 1.95 | 0.98 | 20 | −79 | −2 | −70 |

TABLE III

| S. No. | IR at (°C.) (ohm Fared) 25 | 85 | GRAIN SIZE (Firing Temp. °C.) μm | EIA Z5U/Y5V |
|---|---|---|---|---|
| 1. | 47,154 | 12,899 | 2.3 (1400) | Y5V |
| 2. | 50,188 | 9,768 | 3.2 (1400) | Y5V |
| 3. | 51,753 | 10,299 | 3.0 (1400) | Y5V |
| 4. | 34,881 | 9,858 | 1.1 (1400) | Y5V |
| 5. | 26,025 | 6,596 | 2.9 (1400) | Y5V |
| 6. | 23,563 | 6,886 | 2.2 (1400) | Y5V |
| 7. | 5,564 | 1,883 | 4.5 (1400) | Y5V |
| 8. | 49,463 | 12,427 | 3.4 (1400) | Y5V |
| 9. | 58,599 | 10,803 | 1.9 (1400) | Y5V |
| 10. | 46,636 | 9,846 | 3.2 (1400) | Y5V |
| 11. | 49,951 | 11,620 | 2.1 (1380) | Y5V |
| 12. | 44,521 | 8,087 | 2.0 (1380) | Y5V |
| 13. | 72,883 | 14,883 | 2.0 (1400) | near Z5U |
| 14. | 106,899 | 14,041 | 1.9 (1400) | near Z5U |
| 15. | 65,381 | 14,258 | 1.9 (1400) | near Z5U |
| 16. | 133,956 | 14,183 | 1.7 (1400) | near Z5U |
| 17. | 40,806 | 6,534 | 1.4 (1400) | near Z5U |
| 18. | 29,679 | 5,901 | 2.0 (1400) | near Z5U |
| 19. | 43,800 | 14,356 | 1.6 (1400) | near Z5U |
| 20. | 61,165 | 10,617 | 1.5 (1400) | near Z5U |
| 21. | 51,995 | 15,194 | 1.5 (1400) | near Z5U |
| 22. | 47,714 | 8,896 | 2.0 (1400) | near Z5U |
| 23. | 12,908 | 13,388 | 1.6 (1400) | near Z5U |
| 24. | 9,822 | 9,111 | 1.4 (1375) | near Z5U |
| 25. | 49,686 | 14,007 | 1.8 (1400) | near Z5U |
| 26. | 3,340 | 5,824 | 8.0 (1400) | Z5U |
| 27. | 50,820 | 18,254 | 1.4 (1400) | Z5U |
| 28. | 132,897 | 16,695 | 2.5 (1400) | Z5U |
| 29. | 58 | 397 | 1.0 (1400) | Z5U |
| 30. | 8,248 | 2,017 | 1.9 (1400) | Z5U |
| 31. | 614 | 564 | 3.0 (1400) | Z5U |
| 32. | 31,372 | 8,229 | 1.6 (1400) | Z5U |
| 33. | 50,644 | 18,401 | 1.4 (1400) | Z5U |
| 34. | 55,523 | 14,129 | 1.7 (1400) | Z5U |
| 35. | 68,278 | 14,116 | 1.8 (1400) | Z5U |
| 36. | 26,938 | 8,691 | 1.9 (1400) | Z5U |
| 37. | 64,374 | 12,824 | 1.6 (1400) | Z5U |
| 38. | 17,888 | 11,237 | 1.6 (1400) | Z5U |
| 39. | 39,216 | 12,364 | 1.8 (1380) | Z5U |
| 40. | 12,860 | 1,259 | 5.0 (1370) | Y5V |

TABLE IV

| S. No. | $(Ba_{1-x+w}Ca_x)(Ti_{1-y-z}Sn_yZr_z)O_3$ X | Y | Z | W | DISCS/MLC | KRT | d.f. % | TCC % −30° C. | +85° C. |
|---|---|---|---|---|---|---|---|---|---|
| 41. | 0.10 | 0.12 | 0.03 | 0.0 | DISC | 16,911 | 0.9 | −84 | −91 |
| 42. | 0.10 | 0.12 | 0.03 | 0.01 | DISC | 13,511 | 0.8 | −80 | −81 |
| 43. | 0.10 | 0.13 | 0.0 | 0.0 | DISC | 18,230 | 1.81 | −86 | −84 |
| 44. | 0.10 | 0.13 | 0.0 | 0.01 | MLC | 18,269 | 1.51 | −89 | −85 |
| 45. | 0.10 | 0.12 | 0.03 | 0.01 | MLC | 18,308 | 3.34 | −82 | −81 |
| 46. | 0.10 | 0.12 | 0.04 | 0.01 | MLC | 15,582 | 3.68 | −86 | −82 |
| 47. | 0.10 | 0.14 | 0.0 | 0.01 | DISC | 18,756 | 1.48 | −82 | −82 |
| 48. | 0.10 | 0.12 | 0.04 | 0.01 | MLC | 18,000 | 1.53 | −81 | −82 |

TABLE V

| OXIDE DOPANT | IONIC SIZE (Å) | GRAIN SIZE (μm) HST #1 | HST #2 | KRT HST #1 | HST #2 | KMAX HST #1 | HST #2 | CURIE PEAK (°C.) HST #1 | HST #2 |
|---|---|---|---|---|---|---|---|---|---|
| — | — | 14.0 | 14.0 | 3,500 | 5,200 | 17,998 | 18,000 | 65 | 55 |
| Nb | 0.69 | 3.3 | 1.5 | 6,991 | 4,341 | 6,995 | 5,475 | 20 | −5 |
| Y | 0.92 | 6.8 | 4.9 | 7,777 | 5,402 | 7,998 | 6,118 | 30 | 5 |
| Gd | 0.97 | 10.0 | 9.0 | 11,706 | 6,210 | 12,113 | 7,846 | 30 | −5 |
| Sm | 1.0 | 11.0 | 10.0 | 12,073 | 7,097 | 12,475 | 9,706 | 30 | −5 |
| Nd | 1.06 | 8.1 | 7.8 | 12,659 | 7,544 | 12,812 | 10,921 | 30 | −5 |
| La | 1.14 | 8.6 | 8.8 | 13,433 | 6,964 | 13,532 | 10,914 | 25 | −10 |

Note: Dopant level = 0.7% for Host #1 and 1% for Host #2

I claim:

1. A dielectric ceramic composition in powder form capable of producing high fired multilayer capacitors having insulating resistance capacitance (RC) above about 10,000 ohm/farads at 25° C. and above about 1,000 ohm/farads at 85° C., and meeting the Z5U and Y5V dissipation factor and temperature coefficient of capacitance (TCC) characteristics specifications of the EIA, consisting of a host material produced in accordance with the formula $(Ba_{1-x} Ca_x)(Ti_{1-y-z}Sn_y Zr_z) O_3$ where x=0.10−0.14, y=0.03−0.12, z=0.04−0.10, and doped with one or more of the oxides of Y, La, Zr, Nb and Mn in an amount not exceeding approximately 2-3% by weight of the total weight of said host material.

2. A dielectric ceramic composition as defined in claim 1, wherein said oxides fall within the ranges of Y=0–0.5 wt. %, La=0.3–1.3 wt. %, Zr=0–1.25 wt. %, Nb=0–0.7 wt. % and Mn=0.15 to 0.25 wt. %.

3. A dielectric ceramic composition as defined in claim 2, wherein x=0.12, y=0.03, z=0.09, and said oxides constitute approximately 0.7 wt. % of said host material.

4. A dielectric ceramic composition as defined in claim 2, wherein x=0.14, y=0.04, z=0.10 and said oxides constitute approximately 1.0 wt. % of said host material.

5. A dielectric ceramic composition as defined in claim 2, wherein the oxide of Mn is present in the form of a nitrate or carbonate.

6. A multi-layer ceramic capacitor having spaced electrodes embedded in a plurality of layers of ceramic dielectric material fired in the range of about 1360° C. to 1400° C., each layer ranging in thickness from approximately 0.8 to 1.2 mil., and having a fired grain size ranging from about 2 um to approximately 9 um, said dielectric composition consisting of a barium titanate compound produced in accordance with the formula $(Ba_{1-x+w} Ca_x)(Ti_{1-y-z} Sn_y Zr_z) O_3$, where x=0.10–0.14, y=0.30–0.14, z=0–0.10, and w=0–0.01.

7. A multi-layer ceramic capacitor as defined in claim 6, wherein x=0.10, y=0.12–0.14, z=0.0–0.04, w=0–0.01, and the dielectric constant at room temperature is in the range of 18,000 to 19,000.

8. A multi-layer ceramic capacitor as defined in claim 6, wherein w=zero, and said barium titanate compound is doped with one or more of the oxides of Y, La, Zr, Nb and Mn in an amount not exceeding approximately 2–3% by weight of the total weight of said barium titanate compound.

9. A multi-layer capacitor as defined in claim 8, wherein x=0.12, y=0.03, z=0.09 and said oxides constitute approximately 0.7 wt. % of said barium titanate compound.

10. A multi-layer capacitor as defined in claim 8, wherein x=0.14, y=0.03, z=0.09, and said oxides constitute approximately 1.0 wt. % of said barium titanate compound.

11. A multi-layer ceramic capacitor as defined in claim 8, wherein said capacitor meets the Z5U and near Z5U specifications of EIA and has a dielectric constant greater than 8000 and an average grain size of less than 2 um.

12. A multi-layer ceramic capacitor as defined in claim 8, wherein said capacitor meets the Y5V specifications of EIA, and has a dielectric constant greater than 14,000 and an average grain size of less than 5 um.

* * * * *